Dec. 3, 1940. N. L. ETTEN 2,223,512
WRINGER RELEASE AND RESET
Filed April 26, 1939 4 Sheets-Sheet 1

Inventor:
Nicholas L. Etten
By Tefft & Tefft
Attys.

Inventor: Nicholas L. Etten

Dec. 3, 1940.  N. L. ETTEN  2,223,512

WRINGER RELEASE AND RESET

Filed April 26, 1939  4 Sheets-Sheet 4

Inventor:
Nicholas L. Etten
By Tefft & Tefft Attys.

Patented Dec. 3, 1940

2,223,512

UNITED STATES PATENT OFFICE 2,223,512

WRINGER RELEASE AND RESET

Nicholas L. Etten, Waterloo, Iowa

Application April 26, 1939, Serial No. 270,114

9 Claims. (Cl. 68—263)

This invention relates to washing machine wringers and more particularly to an improved and simplified wringer release and reset mechanism.

One of the objects of the invention is to provide a release and reset mechanism for domestic washing machine wringers of extreme simplicity and rugged nature, such that it will be capable of unusually economical manufacture.

Another important object of the invention is to provide a wringer release mechanism of such design and construction that it cannot be readily released by accidental shock imposed upon the wringer frame.

Another important object of the invention is to provide a wringer mechanism of such design that the release latch surfaces operate under a pressure very materially less than the operating pressure between the rolls with the result that these latch surfaces may be manually operated with minimum frictional resistance.

A further object of the invention is to provide manual wringer release means, whereby the manual effort exerted by the operator is applied directly to the wringer latch mechanism without being transmitted through any intermediate linkages or other power transmission means.

A further object of the invention is to provide a non-fly reset lever for a wringer, of such design and construction that the lever may move through an arc of considerable magnitude to afford a great mechanical advantage to the manual effort exerted by the operator in actuating the reset lever, but will not be subject to extreme or violent movement at the time the emergency release mechanism of the wringer is actuated.

Another important object of the invention is to provide a wringer construction wherein the wringer spring is held in compressed position by an unstable primary latch secured against release by a latch lock, the latch lock being releasable by the operation of either one of a pair of secondary latches.

These and other important objects are accomplished in the present invention as disclosed hereinafter, reference being had to the accompanying drawings included in and forming a part of this specification.

It should be pointed out that a wringer release mechanism is primarily intended as an emergency safety device and must, therefore, be of such design and construction as to be absolutely dependable in operation, not only when properly maintained and cared for, but under the most adverse operation conditions and under extreme and continued abuse and neglect.

It should also be understood that in a highly competitive manufacturing field, such as the washing machine industry, these objects must be accomplished by a structure that is of extreme simplicity and capable of very economical manufacture in order that the manufacturing cost of the device shall be sufficiently low that it will find a ready market.

In the prior art innumerable wringer release latches have been designed and marketed, but so far as is known, any of the constructions capable of economical manufacture have been found objectionable, either by reason of the fact that the latch mechanisms are apt to develop friction and thus become extremely difficult to operate under emergency conditions, or because in an effort to avoid this difficulty the latch mechanisms have been made so sensitive that they are subject to accidental release by jars or physical shock to the wringer structure.

These faults sometimes result in an extremely dangerous device since operators unfamiliar with the mechanical structure of the device often make it a practice to test the wringer release mechanisms by actuating the release under normal operating pressure, when in fact the pressure spring may be compressed to an extreme point at the time when an actual emergency exists and thus cause the wringer release to fail in actual operation, although the operator believes it to be in satisfactory working condition. This condition arises from the fact that the friction existing between the releasing latch surfaces is variable in accordance with the degree of pressure being exerted by the wringer spring. While this friction may not be excessive in normal operation, yet in an emergency, as, for example, in case the operator's hand should come between the rolls, the rolls will be forced apart and the pressure spring greatly compressed with the result that the friction inherent in the latch may become so great that the latch will fail to release.

This difficulty is overcome in the present invention since the force acting between the latching surfaces is reduced to such an extent that they may be readily released by hand even under the most extreme pressure conditions. This being true, it will be readily appreciated that the releasing effort may be applied directly to the latch members without any necessity for providing linkages or levers to increase the mechanical advantage effective upon the latch and that the elimination of all of these linkages or levers commonly found in the prior art structures not only effects manufacturing economies, but adds to the dependability and ruggedness of construction of the entire machine.

With reference more particularly to the drawings.

Figure 1:
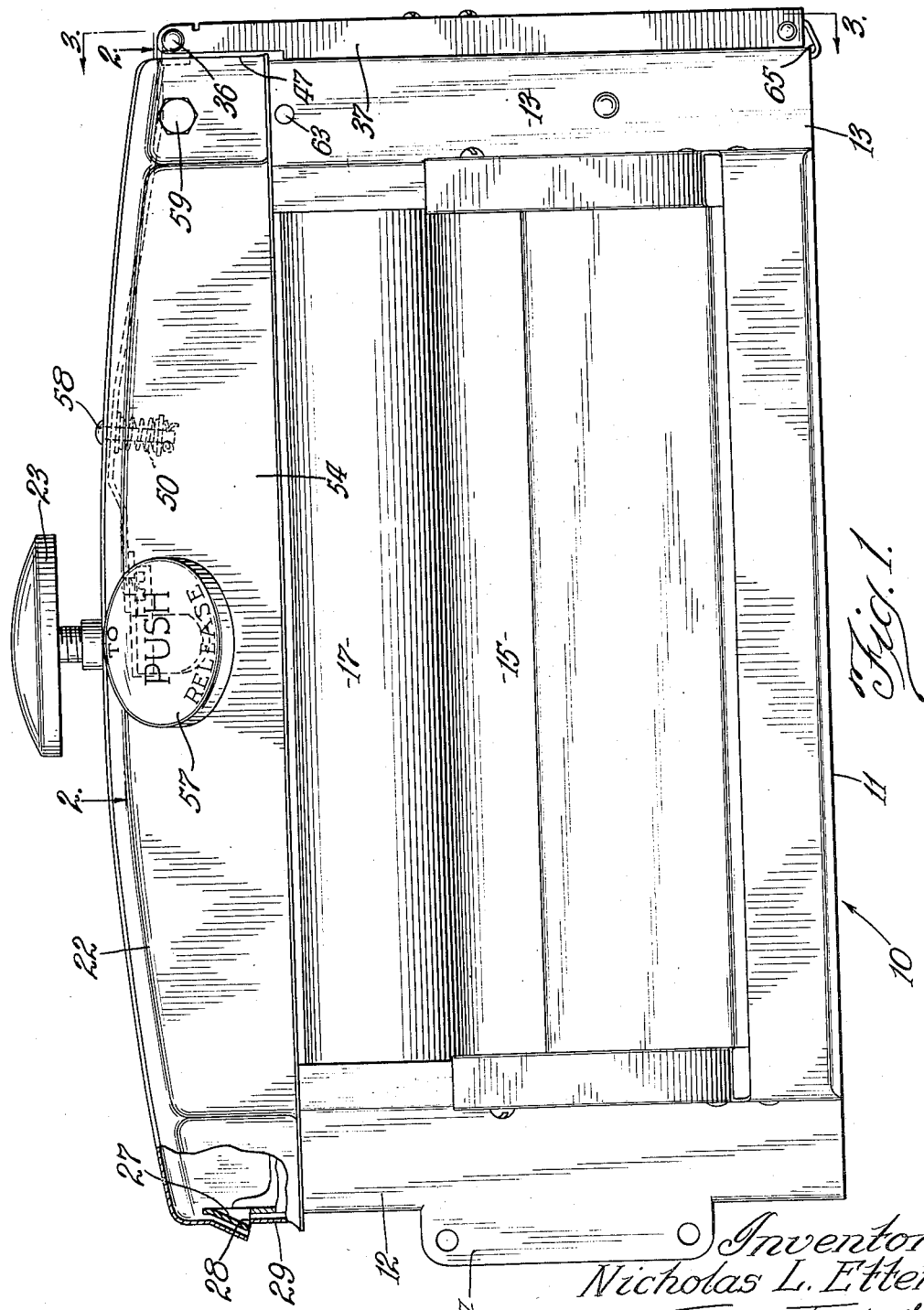
Fig. 1 is a front elevation of a wringer mechanism incorporating a release and reset mechanism illustrative of the principles of this invention.
Figure 2:
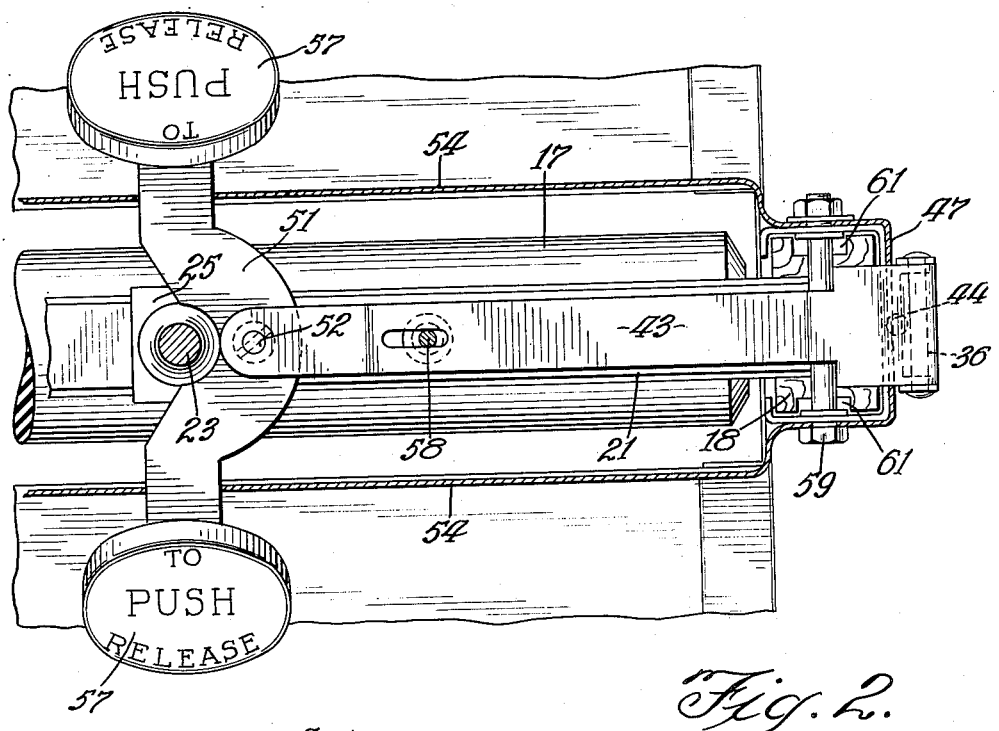
Fig. 2 is a fragmentary plan sectional view taken substantially on the plane of the line 2—2 in Fig. 1.
Figure 3:
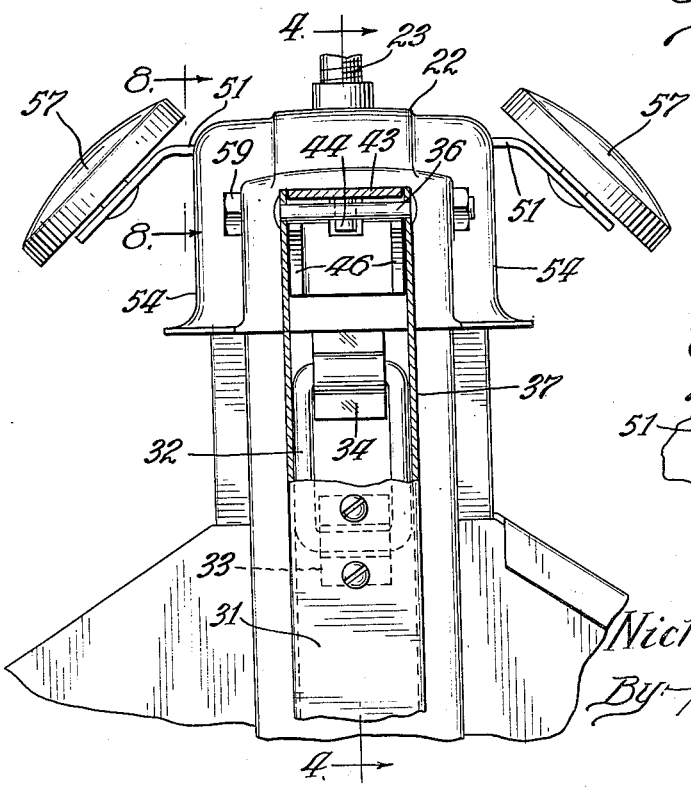
Fig. 3 is an end elevational view of the wringer structure taken partly in section along the plane of the line 3—3 in Fig. 1.

In brief, the invention here disclosed comprises a new and improved release and reset mechanism and is customarily used in connection with any ordinary washing machine wringer including a frame in which a pair of wringer rolls are rotatably mounted for power operation and are urged into pressure relationship with each other by means of a pressure spring.

In one of the most common types of construction, a lower wringer roll is mounted on suitable bearings in the frame and is connected with a power driving mechanism, while the upper wringer roll is mounted for rotation in vertically slidable bearings and is forced downwardly by a flat pressure spring extending from one bearing to the other and being secured at its center point to a removable top frame member which is releasably mounted on the main frame and which serves as a spring anchor by securing the center point of the spring in predetermined position.

To release this type of wringer, it is common practice to release the fastenings whereby the top frame member is secured to the main frame and thus allow the pressure spring to throw the top frame upwardly, so the pressure spring may assume its normal shape and will no longer exert a downward force upon the roll bearings.

To reset the wringer, leverages may be provided to draw the top frame downwardly from its released position to its operating position under force sufficient to compress the pressure spring. As an alternative construction, the spring pressure may be relieved by unscrewing the pressure adjusting screw upon which the spring is mounted and, while the pressure is thus relieved, the top frame may be manually replaced on the main frame and secured in position. The pressure is then reestablished by returning the adjusting screw to its normal operating position.

To accomplish these functions in the present invention, one end of the top frame is hooked to the main frame in the usual manner and the other end is secured to the main frame by an unstable latch. This latch is of such design that the operating pressure of the wringer acting on it will cause it to release unless it is locked in engaged position by a latch locking bar mounted in the top frame. The latch locking bar is so arranged that it is in turn secured against movement by a release member which may be released by the operation of either one of a pair of secondary release latches. These secondary release latches are stable in design in that the force operating between the latching surfaces does not tend to cause the latch to release. However, they operate under very low pressure as compared with the pressure normally exerted on the unstable primary latch and, therefore, may be freely and easily actuated by hand. The release of either of the secondary latches allows the latch locking bar to release the unstable primary latch and thus free the top frame from the main frame and release the pressure effective between the wringer rolls.

The preferred construction of the invention is illustrated in connection with the wringer mechanism including a main frame 10 which comprises a lower channel 11 and vertical bearing slideways 12 and 13, the bearing slideway 12 being preferably provided with the bracket portions 14, whereby the entire wringer structure may be mounted on a gear box or power head in a manner customarily employed in the art. The lower wringer roll 15 is journalled for rotation in a pair of stationary bearing members 16, one of which is mounted in each of the vertical bearing slideways 12 and 13 and suitable driving connections are established in order that the roll 15 may be power driven from the power head on which the entire wringer structure is mounted. The wringer roll 17 is journaled in a pair of bearing members 18, one of which is mounted in each of the vertical bearing slideways 12 and 13, but these upper roll bearings 18 are free to slide vertically to permit upward axial displacement of the upper roll 17 in accordance with the varying thicknesses of goods being passed between the wringer rolls.

A flat pressure spring 21 is so arranged that its oppositely disposed end portions rest on the top surfaces of each of the upper roll bearings 18. The pressure spring 21 is mounted within the top frame or spring anchor 22 by means of an adjusting screw 23 threaded in a bushing 24 in the frame 22 and secured to the spring 21 by a clip 25 carried on a reduced end portion 26 of the adjusting screw 23. The top frame 22 is removably secured to the main frame 10 at one end by a hooked portion 27 stamped in the vertical bearing slideway 12 which engages an orifice 28 stamped in the downwardly extending end flange 29 of the top frame 22.

The opposite end of the top frame 22 is not directly connected to the main frame 10 but is secured to a reset lever 31 in such a manner that the top frame 22 may be drawn downwardly toward the main frame 10 with sufficient force to compress the pressure spring 21 sufficiently to provide the initial tension necessary for satisfactory operation of the machine. The reset lever 31 is mounted on the main frame 10 by means of a compression link 32 extending between a bracket 33 affixed to the lever 31 and a similar bracket 34 spot-welded or otherwise secured to the outer surface of the vertical bearing slideway 13.

Figure 8:
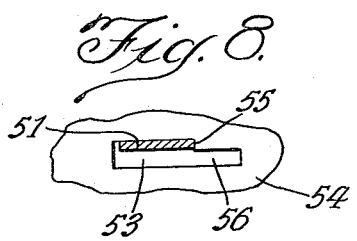
Fig. 8 is a detail sectional view taken substantially on the plane of the line 8—8 of Fig. 3, and illustrating one of the secondary latch mechanisms.
Figure 4:
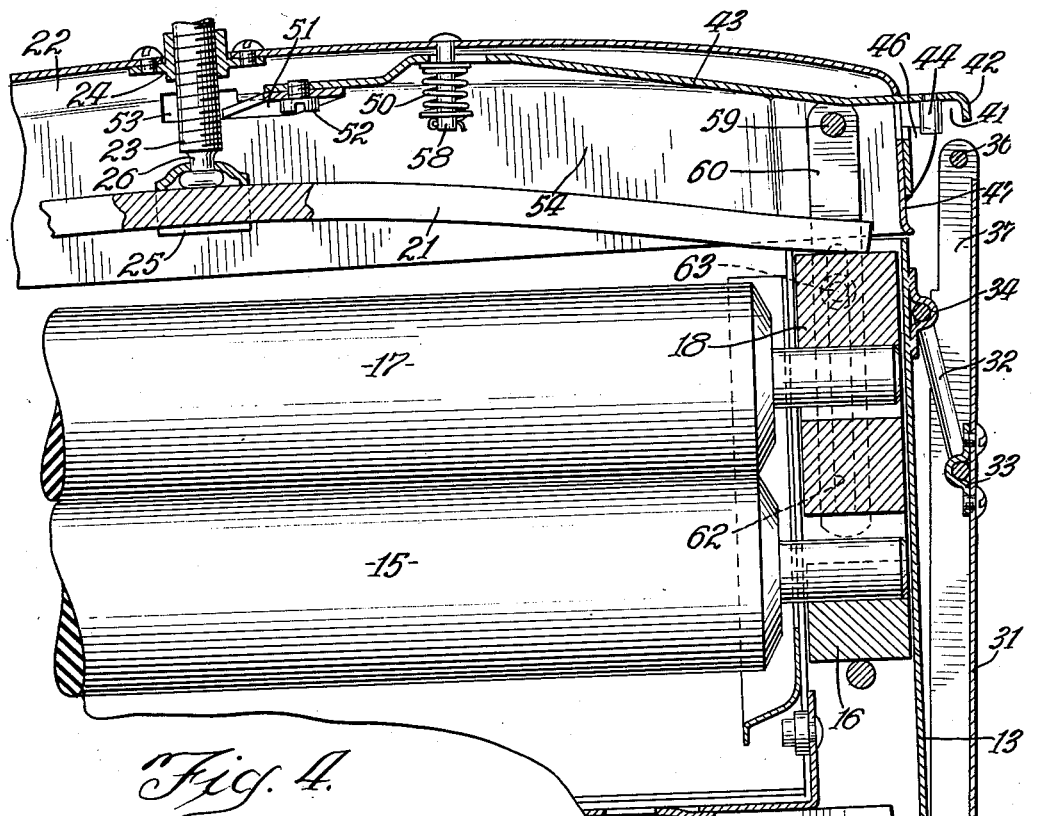
Fig. 4 is a detail sectional view taken substantially on the plane of the line 4—4 of Fig. 3, but showing the several parts of the mechanism in released position.
Figure 5:
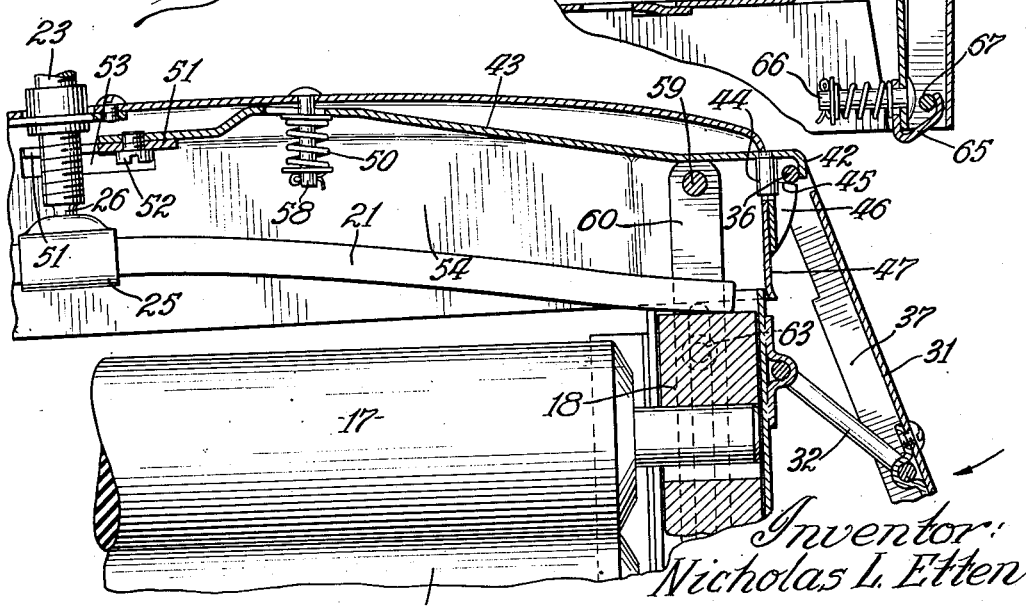
Fig. 5 is a detail sectional view similar to Fig. 4, showing the several parts in one of the positions they assume during the resetting operation.

The connection between the reset lever 31 and the top frame 22 is accomplished by means of a latch pin 36 extending between a pair of flanges 37 formed on the reset lever 31. The pin 36 may be solidly fixed in the flanges 37, if desired, or it may be rotatably mounted in such a manner that it may act as a roller during the releasing operation of the mechanism. To establish the connection between the top frame 22 and the reset lever 31 the pin 36 is moved into a socket 41 provided between a downwardly extending hook portion 42 of the latch locking bar 43 and a reset pin 44 riveted in the bar 43 and extending downwardly adjacent the hook portion 42. The pin 36 is then moved to the left, as viewed in Fig. 5, in such a manner that it will bear against the pin 44 and move the entire latch locking bar 43 from the unlocked position shown in Fig. 4 to the locked position shown in Fig. 5. As this is done the pin 36 is locked in the socket 41, since this movement of the latch locking bar 43 causes the socket to move to such a position that it is closed at the bottom by the latch member 46, spot-welded to the downwardly extending end flange 47 of the top frame 22. The pin 36 will now rest upon the upper cam surface 45 of the latch member 46, and will be locked in the socket 41 in such a manner that by operation of the reset levers the top frame may be drawn downwardly into operating position against the pressure of the spring 21, as will be pointed out in detail hereinafter. The latch locking bar 43 is pivotally secured to a latch release member 51 by the stud 52. The latch release member 51 extends horizontally across the top frame 22 of the machine and extends through a pair of L-shaped latch perforations 53 one of which is stamped from each of the downwardly-extending side flanges 54 of the top frame 22. The latch perforations 53 are each provided with a latching surface or shoulder 55 which will limit the movement of the release member 51 as long as the release member 51 is restrained against downward movement, but whenever the member 51 is moved downwardly it will disengage the latch surface 55 and is then free for movement along the release channel 56 of the perforations 53 (see Fig. 8). This movement is normally prevented by a light coil spring 50, which is carried on a pin 58 mounted in the top frame 22 and acts upwardly against the lower surface of the latch locking bar 43 to hold the latch release member 51 in raised position such that it is in engagement with the latching surfaces 55 in the latch perforations 53.

To operate the emergency release mechanism, the operator may depress either of the release buttons 57, one of which is attached at each end of the release member 51. Downward movement of either of these buttons will depress one end of the release member 51, and cause it to be disengaged from the latching surface 55 of the perforations 53 and be free to move to the right, as viewed in the drawings, along the release channel 56.

The force effective to cause this movement to take place is transmitted through the mechanism from the main spring 21, since the upper cam surface 45 of the latched member 46 attached to the top frame 22 is inclined at an angle sufficient that the pressure of the spring 21 will cause the pin 36 to be urged outwardly against the hooked portion 42 of the latched locking bar 43. The pin 36 therefore exerts a force tending to move the latch bar 43 to the right at all times when the spring 21 is under pressure, but the inclination of the cam surface 45 is such that the magnitude of the force acting upon the latch locking bar 43 is very greatly reduced as compared with the magnitude of the force exerted between the latch member 46 and the pin 45 by the pressure spring 21.

It is desirable to reduce the forces acting between the latch surfaces 55 and the release member 51 to a minimum in order that these latches may be free to release under very light manual pressure even when the pressure spring 21 is compressed to an extreme degree, but the force tending to move the locking bar 43 must be sufficient to insure absolute dependability of operation, and it has therefore been found advantageous to reduce the forces acting between the latching surfaces 55—51 to lesser magnitude than the force exerted upon the locking bar. This is accomplished in the preferred construction illustrated, since the force exerted by the action of the cam surface 45 on the pin 36 and tending to move the latch locking bar 43 to the right is divided between the two secondary latch mechanisms, and the latch release member 51 acts as a lever which may pivot on either of the latch surfaces 55 as a fulcrum at the moment that the opposite latch mechanism is released.

The arrangement is such that when one of the secondary latches is released the latch locking bar 43 will be positively moved to the right in such a manner that the hooked portion 42 and pin 44 move beyond the latch member 46 and unlock the socket 41 to release the pin 36, so that the entire top frame structure 32 may be thrown upwardly under the pressure exerted by the spring 21.

A pair of limit links 60 are attached to a cross bolt 59 extending between the side flanges 54 of the top frame 22 and extend downwardly into the vertical bearing slideway 13 in notches 61 cut in the upper roll bearings 18. The lower ends of these links are mounted on a pair of rivets 63 on the slideway 13, and these links 58 are each provided with elongated slots 62 in order to limit the upward throw of the top frame assembly 22 at the time of release.

To reset the mechanism, the pin 36 is again positioned in the socket 41 and moved inwardly against the pin 44 to slide the latch locking bar to the left until the latch release member 51 is moved to its extreme left position and snapped upwardly so that each end of the release member 51 seats against the latching surface 55 of the perforation 53. The socket 41 has now moved inwardly above the latch member 46 in such a manner that the pin 36 is securely locked against release, and the operating pressure may be reestablished between the rolls by pivoting the reset lever 31 downwardly in the direction indicated by the arrow in Fig. 5, to draw the entire top frame structure 22 downwardly against the force exerted by the pressure spring 21. The reset lever 31 is locked in its set position against the vertical bearing slideway 13 by a latch 65 mounted under spring tension on a pin 66 near the bottom of the bearing slideway 13 and so positioned as to engage the latch pin 67 affixed to the lower end of the reset lever 31. Under certain circumstances it may be desirable to dispense with this latch member 65, maintaining the reset lever 31 in its locked position by moving the compression link 32 across dead center or in any other desirable manner, but the latch 65 is illustrated as the present preferred means of accomplishing the desired result.

Figure 6:
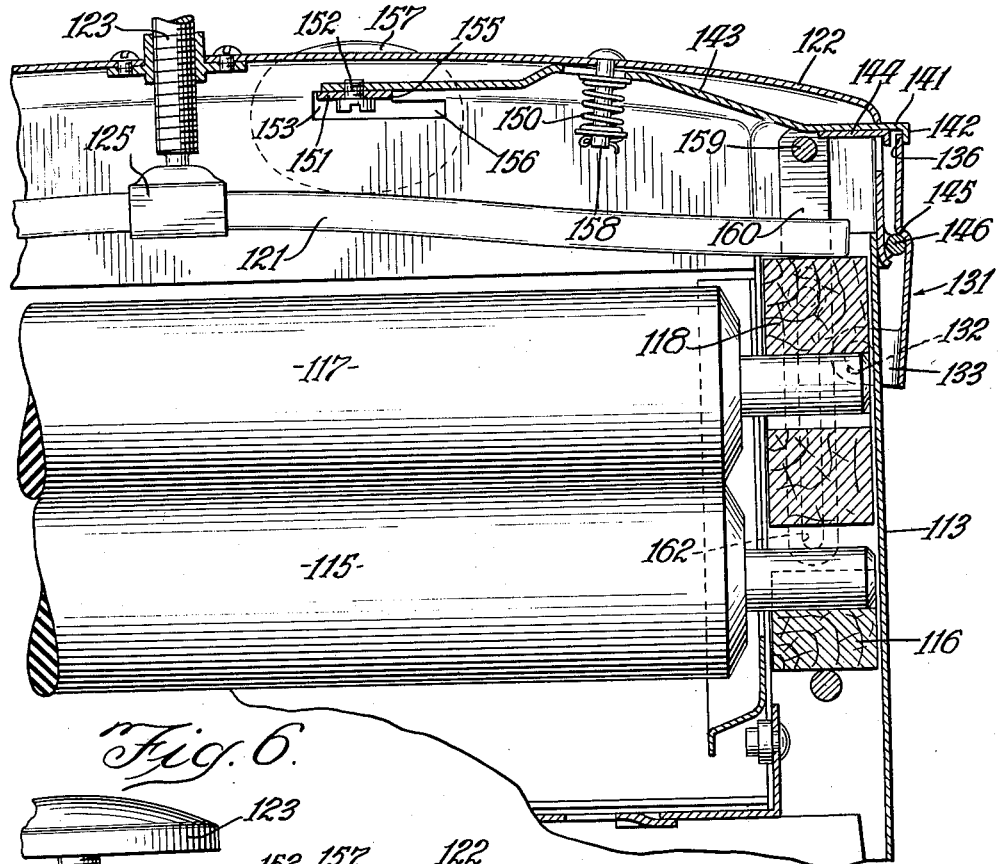
Fig. 6 is a detail sectional view of a slightly modified application of the invention.
Figure 7:
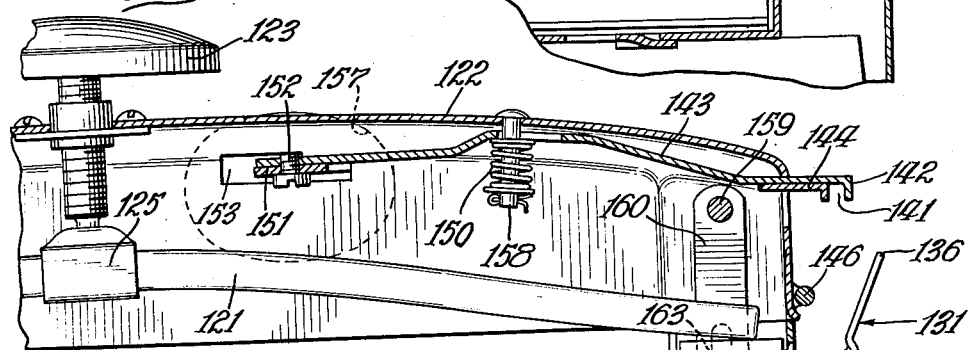
Fig. 7 is a detail view similar to Fig. 6, showing the several parts of the structure in released position.

In Figs. 6 and 7 a slightly modified form of the invention has been illustrated, which differs from the structure heretofore described, principally in that the resetting leverages are not used and the resetting of the wringer mechanism is accomplished in a somewhat different manner.

A latch member 146 is secured to the top frame structure 122 by welding or otherwise and cooperates with a swinging latch member 131 pivotally mounted on rivets 132 secured in the side walls of the vertical bearing slideway 113 and extending outwardly through lugs 133 formed integral with the swinging latch member 131. The swinging latch member 131 is bent or offset to provide a cam surface 145 which will engage the latch member 146 secured to the top frame 122 and thus hold the top frame 122 in operating position so long as the swinging latch member 131 is restrained against clockwise pivotal movement by the hooked portion 142 which forms one side of the socket 141 in which the extreme upper end 136 of the swinging latch member 131 is secured. The release is accomplished as in the previous construction by momentarily depressing one of the buttons 157 in such a manner as to disengage one end of the latch release member 151 from the latching surface 155 of the perforation 153 and allow it to move to the right along the release channel 156 under the influence of the reduced force transmitted to the latch locking bar 143 by the action pressure spring 121 upon the latch member 145 and through the cooperating cam surface 146. When either of the release buttons 157 are depressed, the latch locking bar 143 may move to the right, as illustrated in Fig. 7, and this movement will be sufficient to allow the swinging latch member 131 to pivot in a clockwise direction around the mounting rivets 132 and disengage the latch member 146 from the cam surface 145. This will completely release the top frame 122 from the main frame 10 and allow the pressure spring 121 to throw the top frame structure 122 upwardly and release the pressure relationship existing between the upper roll 117 and the lower roll 115. As in the structure previously described, limit links 160 including slots 162 engaging the rivets 163 are provided to prevent excessive movement in the event that the release mechanism is actuated when the wringer is operating under extreme pressure conditions.

To reset this structure the operator should first unscrew the pressure adjusting screw 123 sufficiently so that the top frame 122 may be returned to its operating position without the necessity of compressing the pressure spring 121. The upper extremity 136 of the swinging latch member 131 is then positioned in the socket 141 at the end of the latch locking bar 143 and moved inwardly against the bracket 144 to slide the latch locking bar 143 to the left until the latch release member 151 comes into alignment with both of the latching surfaces 155 in the side walls of the top frame 122 and is snapped upwardly into latched position by the light compression spring 150 mounted on the pilot pin 158. The wringer pressure member may then be reestablished by rotating the pressure adjusting screw 123 to bear down against the center point of the flat spring 121 until the spring 121 is flexed sufficiently to provide initial operating pressure between the rolls.

While it is believed that the advantages inherent in the construction just described will be apparent from the above description, it may be well to point out that the construction is such that an unusually light pressure will be effective to cause operation of the emergency release mechanism, even under extreme pressure conditions, and that when this release is actuated there is no violent movement of the external parts of the machine such as might cause injury to the operator, since the reset lever cannot fly outwardly from the machine frame. Also, the wringer cannot be accidentally released by mechanical shock imposed on the structure, since the pin 36 is positively in the socket 41.

From the foregoing description it will be apparent that the application of the principles of the present invention accomplish certain important advantages, in that it is possible to provide a construction of extreme simplicity which requires no unusual degree of precision in construction and is therefore capable of extremely economical manufacture, and yet provides operative features found heretofore only in comparatively complicated, expensive, and mechanically unreliable structures.

It is to be understood that while the particular constructions shown and described herein are the present preferred embodiments of the invention, these are intended to be illustrative only and it is contemplated that various modifications may be made other than those specifically illustrated, without departing from the spirit or the scope of the invention as defined by the appended claims.

I claim:

1. In a clothes wringer including, a pair of wringer rolls and spring means for establishing cooperating pressure relationship between said rolls, the combination of a plurality of relatively movable frame members normally urged apart under the influence of said pressure spring, an unstable primary latch mechanism securing said frame members against relative movement, latch locking means movable between a locked position, wherein it is effective to prevent release of said unstable primary latch and an unlocked position wherein it is effective to permit release of said unstable primary latch, lever mechanisms operatively connecting said latch locking means with a plurality of stable secondary latch mechanisms effective to secure said latch lock in its locked position, means for manually actuating any one of said secondary latch mechanisms, cam means formed in said primary latch whereby said latch locking means is urged toward its unlocked position, said primary latch being responsive to the operation of any one of the said secondary latches for permitting movement of the latch locking means to an unlocked position and release of said primary latch.

2. In a clothes wringer including, a pair of wringer rolls and spring means for establishing cooperating pressure relationship between said rolls, the combination of a plurality of relatively movable frame members normally urged apart under the influence of said pressure spring, an unstable primary latch mechanism securing said frame members against relative movement, latch locking means movable between a locked position, wherein it is effective to prevent release of said unstable primary latch and an unlocked position wherein it is effective to permit release of said unstable primary latch, lever mechanisms operatively connecting said latch locking means with a secondary latch mechanism effective to secure said latch lock in its locked position, means for manually actuating said secondary latch mechanism, means whereby said latch locking means is urged toward its unlocked position, said primary latch being responsive to the operation of said secondary latch for permitting movement of the latch locking means to an unlocked position and release of said primary latch.

3. In a clothes wringer including a frame, a pair of wringer rolls rotatably mounted in said frame and spring means for establishing cooperating pressure relationship between said rolls, the combination of an unstable primary latch normally maintaining said rolls in cooperating pressure relationship, latch locking means securing said primary latch against release, a plurality of stable secondary latches capable of direct manual manipulation, said primary latch being responsive to the operation of either secondary latch for releasing the latch locking means.

4. In a clothes wringer including, a pair of wringer rolls and spring means for establishing cooperating pressure relationship between said rolls, the combination of a plurality of relatively movable frame members normally urged apart under the influence of said pressure spring, an unstable primary latch mechanism securing said frame members against relative movement, latch locking means movable between a locked position, wherein it is effective to prevent release of said unstable primary latch and an unlocked position wherein it is effective to permit release of said unstable primary latch, mechanisms operatively connecting said latch locking means with a secondary latch mechanism effective to secure said latch lock in its locked position, means for manually actuating said secondary latch mechanism, and means whereby said latch locking means is urged toward its unlocked position.

5. In a wringer, a frame, a plurality of cooperating pressure rolls; a pressure spring effective to establish cooperating pressure between said rolls, and a releasable spring anchor structure comprising a spring supporting frame, a resetting lever mechanism comprising a manually operable reset lever and a resetting link interconnecting said wringer frame and said spring supporting frame, a releasable pivotal connection between said resetting lever mechanism and one of said frame members, pivot locking means for said pivotal connection, movable between a locked and unlocked position, means responsive to the pressure spring for moving said pivot lock to an unlocked position, a latch mechanism effective to maintain said pivot locking means in a locked position, and manually operable locking facilities for returning said pivotal connection to locked position.

6. In a wringer, a frame, a plurality of cooperating pressure rolls; a pressure spring effective to establish cooperating pressure between said rolls, and a releasable spring anchor structure comprising a spring support, a resetting lever mechanism interconnecting said wringer frame and said spring support, a releasable pivotal connection between said resetting lever mechanism and one of said frame members, pivot locking means for said pivotal connection movable between a locked and unlocked position, and a latch mechanism effective to maintain said pivot locking means in a locked position.

7. In a wringer, a plurality of cooperating pressure rolls, a pressure spring effective to establish operating pressure between said rolls, a plurality of relatively separable frame members, a pivot pin socket carried by one of said frame members, a reset lever mechanism including a pivot pin whereby said separable frame members may be forced into operative position against the force of said pressure spring, socket locking mechanism whereby said pivot pin may be locked against removal from said socket, and latch means whereby said socket locking mechanism may be held or released.

8. In a wringer, a plurality of cooperating pressure rolls, a pressure spring effective to establish operating pressure between said rolls, a plurality of relatively separable frame members, a pivot pin socket, a reset lever mechanism including a pivot pin whereby said separable frame members may be moved into operative position, socket locking mechanism whereby said pivot pin may be locked against removal from said socket, and latch means whereby said socket locking mechanism may be held or released.

9. In a wringer, a plurality of cooperating pressure rolls, a pressure spring effective to establish operating pressure between said rolls, a plurality of relatively separable frame members, a latch socket carried by one of said frame members, socket locking mechanism whereby said latch socket may be locked against release, and latch means whereby said socket locking mechanism may be held or released.

NICHOLAS L. ETTEN.